Figure 4:
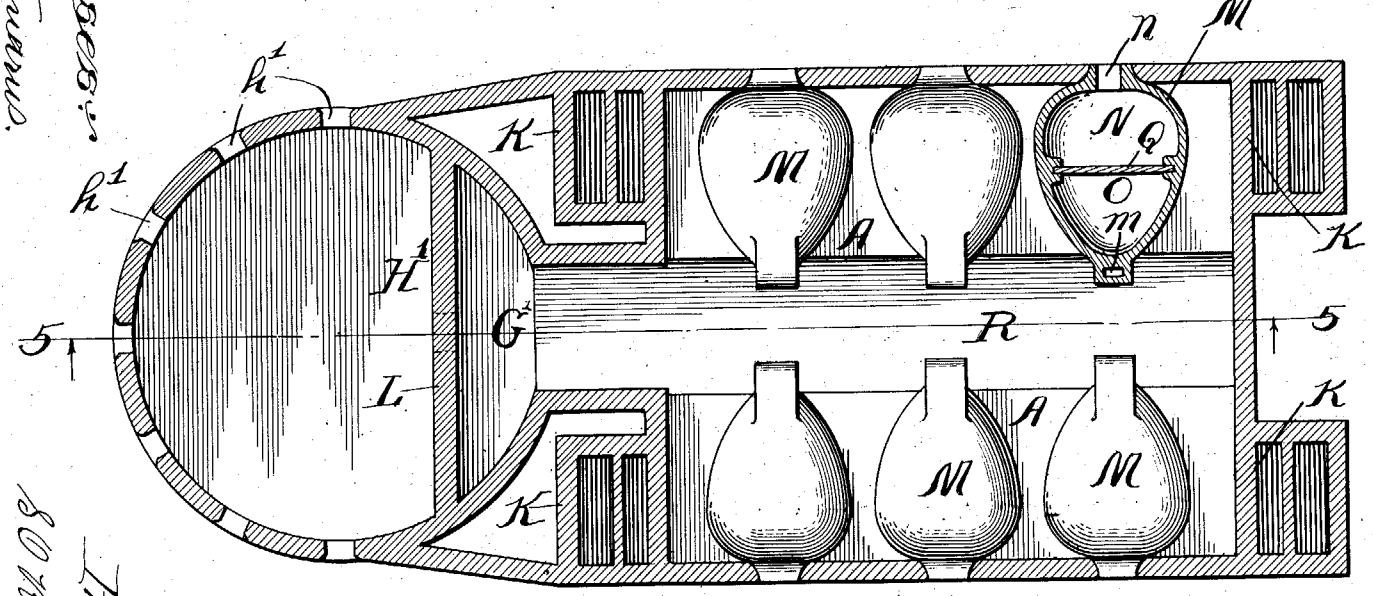

No. 12,323. REISSUED FEB. 28, 1905.
S. O. RICHARDSON, Jr.
GLASS FURNACE.
APPLICATION FILED SEPT. 14, 1904.
4 SHEETS—SHEET 1
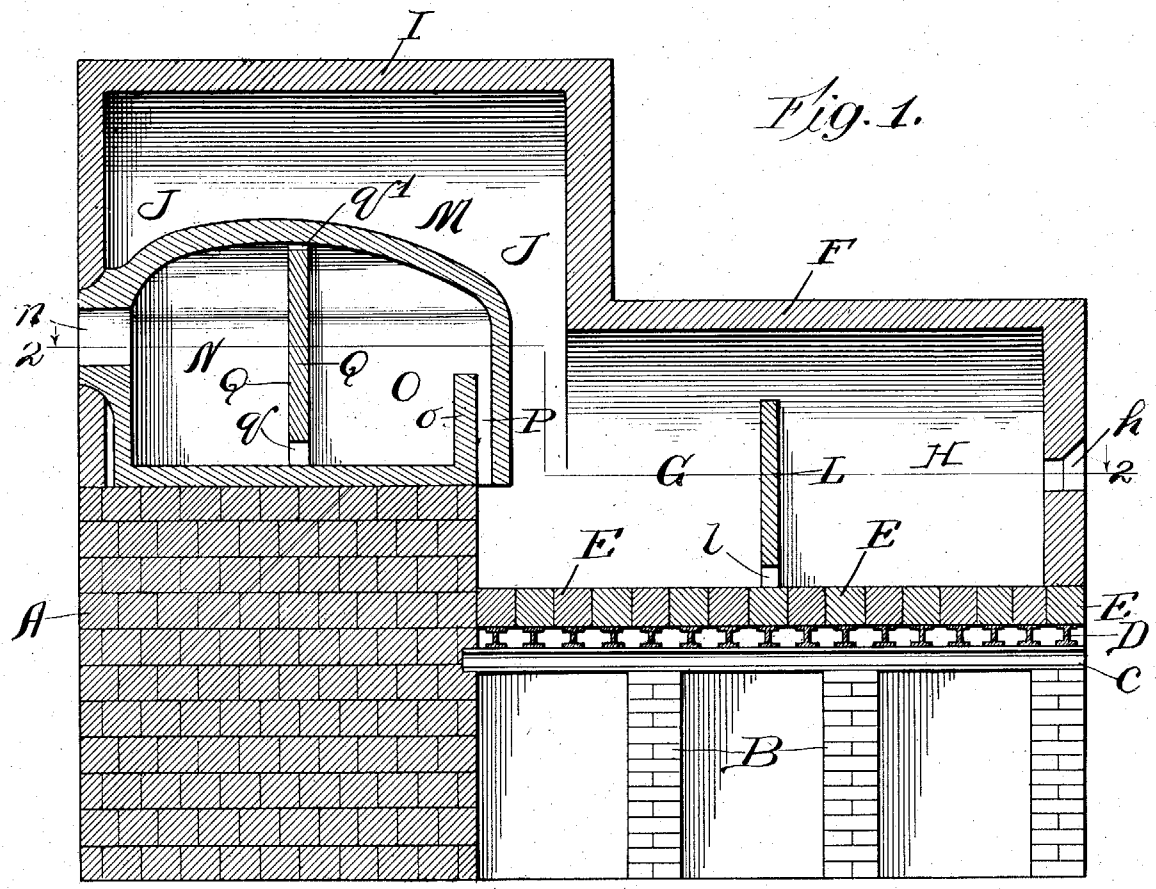
Witnesses:
G. V. Domarus.
J. B. Weir
Inventor:
S. O. Richardson Jr.
By Raymond & Barnett
attys.

No. 12,323. REISSUED FEB. 28, 1905.
S. O. RICHARDSON, JR.
GLASS FURNACE.
APPLICATION FILED SEPT. 14, 1904.
4 SHEETS SHEET 2.
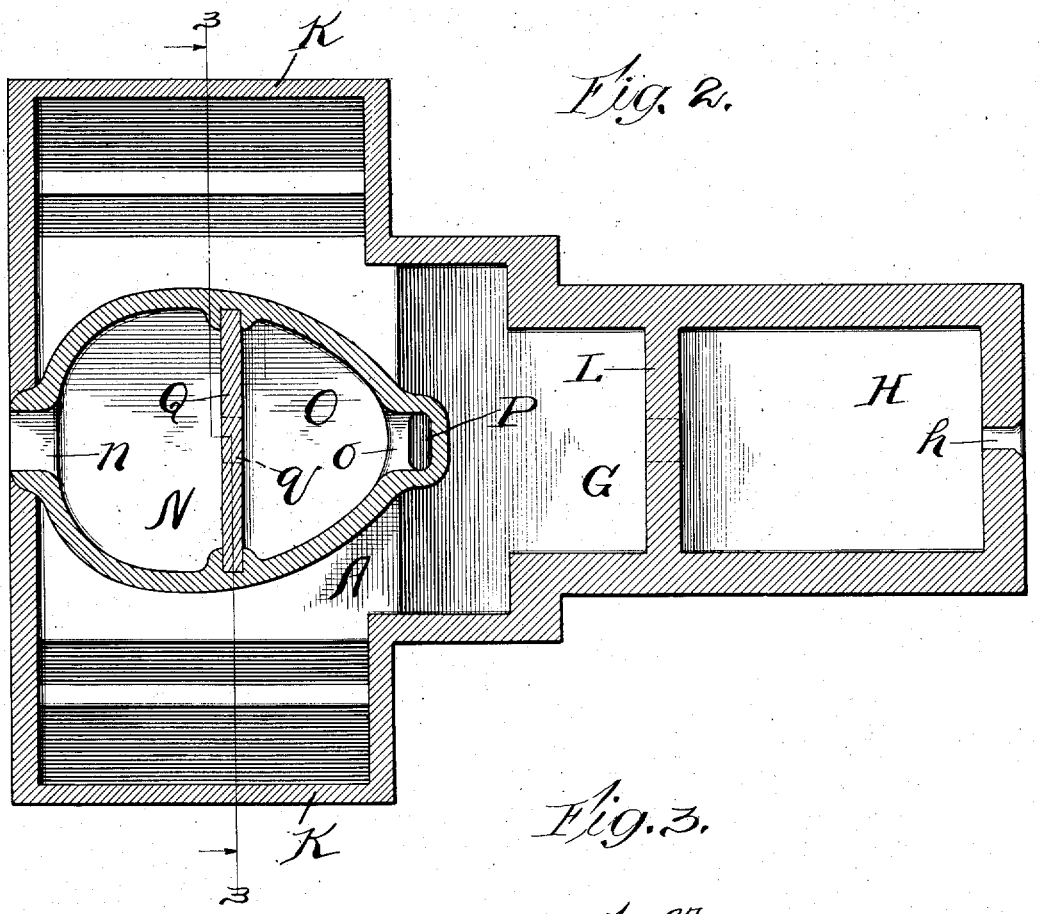
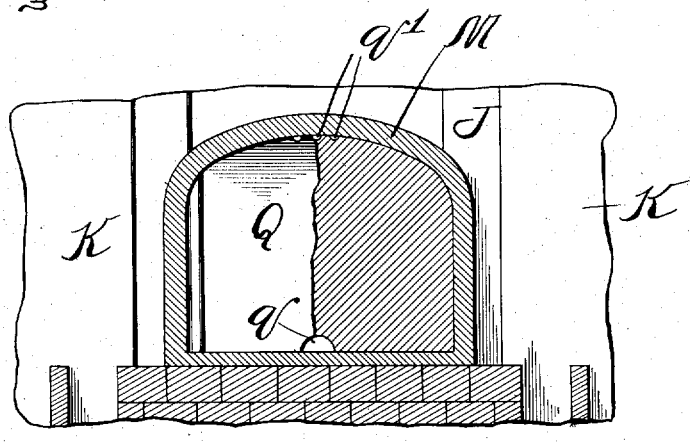
Witnesses:
C. G. V. Donovan.
J. B. Weir
Inventor:
S. O. Richardson Jr.
By Raymond & Barnett
attys.

No. 12,323. REISSUED FEB. 28, 1905.

S. O. RICHARDSON, JR.

GLASS FURNACE.

APPLICATION FILED SEPT. 14, 1904.

4 SHEETS—SHEET 3.

Witnesses:
G. V. Donaru.
J. B. Weir

Inventor:
S. O. Richardson Jr.
By Raymond & Barnett
Attys.

No. 12,323. REISSUED FEB. 28, 1905.
S. O. RICHARDSON, Jr.
GLASS FURNACE.
APPLICATION FILED SEPT. 14, 1904.
4 SHEETS—SHEET 4.
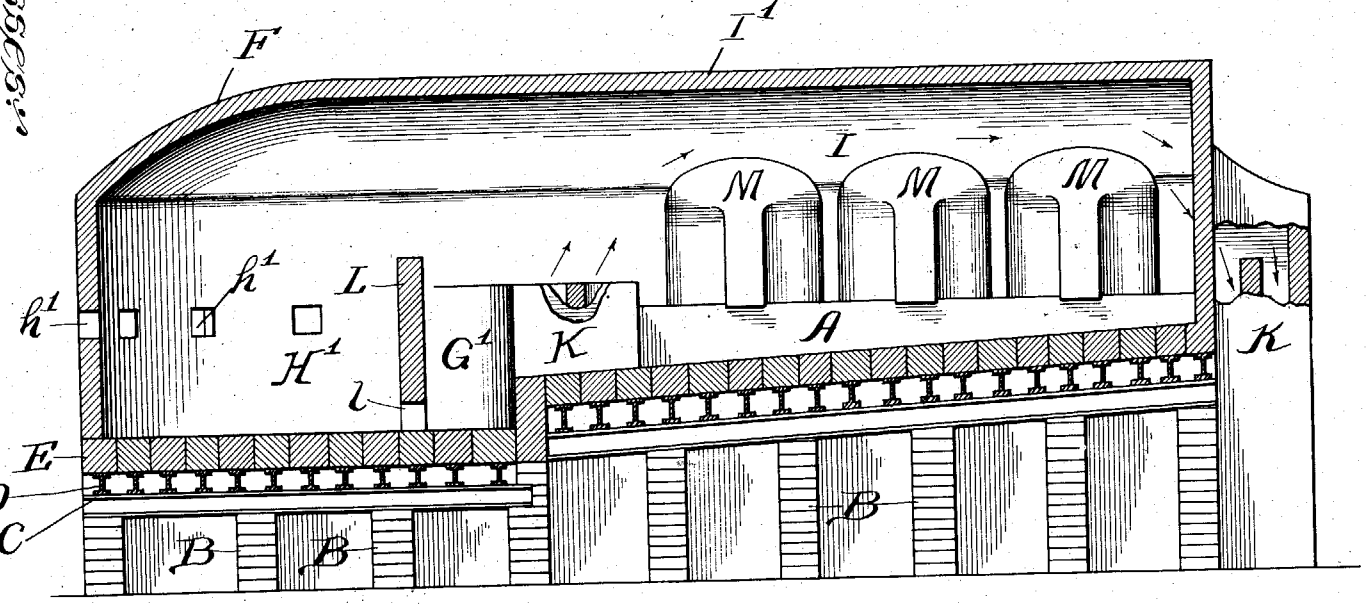
Witnesses:
C. G. V. Donwards.
J. B. Weir
Inventor:
S. O. Richardson Jr.
By Raymond & Barnett
Attys.

No. 12,323. Reissued February 28, 1905.

UNITED STATES PATENT OFFICE.

SOLON OSMOND RICHARDSON, JR., OF TOLEDO, OHIO.

GLASS-FURNACE.

SPECIFICATION forming part of Reissued Letters Patent No. 12,323, dated February 28, 1905.

Original No. 756,409, dated April 5, 1904. Application for reissue filed September 14, 1904. Serial No. 224,479.

*To all whom it may concern:*

Be it known that I, SOLON OSMOND RICHARDSON, Jr., a citizen of the United States, residing at Toledo, in the county of Lucas and State of Ohio, have invented certain new and useful Improvements in Glass-Furnaces, of which the following is a specification.

My invention relates more particularly to furnaces for the manufacture of lead glass, and is especially adapted for use with furnaces of the regenerative type.

The object of my invention is to provide a furnace for the continuous manufacture of lead glass in such a manner that the melting of the batch and the planing of the melted glass will be accomplished in a closed pot in such a manner that the glass during the melting and planing stages will not be directly exposed to the melting-flames, and yet the manufacture of the glass may be carried on continuously.

As is well known in this art, to attain the best results in the manufacture of certain kinds of glass, such as lead glass, it is necessary that the glass shall not be exposed to the direct action of the melting-flames during the melting and planing stages; otherwise the glass will be impure and of inferior quality. It is therefore the present practice to manufacture such fine qualities of glass in closed pots, the batch being put in the pot, melted, and planed and then the glass worked out of the pot until the pot is emptied, whereupon the pot is again recharged and a fresh batch melted, planed, and worked out, as before. Obviously this prevents a continuous operation, necessitates more or less handling of the pot and the cooling of the glass as it is being worked out of the pot, and the disadvantage of working the glass from a continually-lowering level, a matter which is especially disadvantageous when working with glass by means of machines, which under such conditions have to be continually adjusted to the changing level of the metal.

Another object of my invention is to so arrange the furnace that the metal may be continuously maintained at a desired level, and the pot will be so arranged that it will not be surrounded or damaged by the mass of metal in the working chamber.

These and such other objects as may hereinafter appear are attained by the devices shown in the accompanying drawings, in which—

Figure 1 is a longitudinal section of a furnace embodying my invention. Fig. 2 is a sectional plan view thereof on the line 2 2 of Fig. 1. Fig. 3 is a sectional detail on the line 3 3 of Fig. 2 looking in the direction indicated by the arrows. Fig. 4 is a sectional plan view of a modified arrangement, and Fig. 5 is a longitudinal section on the line 5 5 of Fig. 4.

Like letters of reference indicate like parts in the several figures of the drawings.

Referring by letter to the accompanying drawings, A is the bench supporting the melting-pot.

B B are piers supporting I-beams C, across which other I-beams D are arranged in a familiar manner, said I-beams D supporting the blocks E, which form the bottom of the working chamber or tank.

F is the crown over the settling-chamber G and working chamber H.

I is the crown over the flameway or furnace-chamber J.

K K indicate the regenerators of any familiar type.

L is a bridge-wall separating the settling-chamber from the working chamber and provided with a passage *l* between said chambers near the bottom of said wall.

*h* is the working opening, the bottom of which is on a plane coincident with or below the top of the bench A.

M is the melting pot or retort, comprising a melting-chamber N, a planing-chamber O, and a metal-conduit P. Arranged transversely of the pot M is a partition Q, provided, preferably, at the lower edge thereof with a passage-way *q*. The partition Q may be also provided above the metal-line with vents *q'*, if desired. The melting-chamber N is provided with a feed-opening *n*.

To provide for expansion and contraction, the partition Q is preferably loosely mounted within the pot M, as more clearly shown in Fig. 2, although such construction may not be essential.

In the operation of my improved furnace the melting-chamber N is charged with the batch, and the regenerators being put into operation the blasts of superheated air and gas pass alternately backward and forward through the flameway J and over the pot or retort M. The batch protected by the pot from direct contact with the melting-flames melts within the chamber N, and the metal flows through the passage *q* into the planing-chamber O, where the planing step in the process of the manufacture of the glass takes place as the metal rises within the planing-chamber O until it overflows the wall or dam *o* and thence passes through the metal-conduit P into the settling-chamber G and thence through the passage *l* under the bridge-wall L and into the working chamber H, thus insuring that the metal in the working chamber is drawn from the bottom of the settling-chamber, where the molten glass is purest. As the refined glass flows into the settling-chamber G it passes away from the zone of intensest heat produced by the heat from the regenerators, while at the same time sufficient heat is radiated from the flameway J into the chambers G and H to maintain the metal at a sufficiently high temperature, while at the same time allowing it to cool to a workable temperature. If desired, the metal in the settling and working chambers may be maintained at the desired temperature by any suitable heating means. While I have referred to the chamber G as a "settling-chamber" and to the chamber H as a "working" chamber, it will be understood that in a larger sense the chambers G and H really constitute the working chamber divided by the partition L with its opening *l*, so as to hold back any surface impurities and insure that only the purest of the glass will flow forward adjacent to the working opening. As the batch in the melting-chamber N melts it is continuously renewed through the feed-opening *n*, so that there is a continuous flow of metal into the working chamber H, and by charging the melting-chamber N from time to time in sufficient quantities to correspond with the amount of metal worked out through the working opening *h* the mass of metal in the working chamber H may be constantly maintained at the desired level. Should the melting proceed more rapidly than the metal is worked out, the working opening *h* will serve as a safety or overflow opening, so that the metal may not rise above the top of the bench A and so all danger of damaging the pot by surrounding it with a mass of melted metal is avoided. With an understanding of the purpose of this feature of my construction, as above explained, it will be seen that for this purpose the top of the bench A is substantially above the plane of the bottom of the working opening even when it is on the same plane therewith, for in that event the metal-line will be exactly on a plane with the top of the bench, and so the metal cannot overflow the bench or rise around the sides of the walls of the melting and planing chambers. The pot is thereby mounted above the metal-line.

In Figs. 4 and 5 I have shown a modification in which a furnace is provided with six pots in oppositely-disposed batteries of three pots each, each battery being provided with its own regenerators, but the two batteries being preferably covered by a common arch I′. This arch or crown I′ is preferably arranged, as shown, so as to extend part way over the settling and working chambers and joining the arch or crown F′. By this arrangement I insure simplicity and stability of construction and also insure ample radiation from the heating-chamber into the settling and working chambers for maintaining the metal in said chambers at the desired temperature. The metal from the two batteries of pots flows into a runway R, whence it passes into a circular working chamber H′, which is provided with working openings *h*′. Except for this rearrangement, whereby my invention is adapted to a larger furnace from which the glass may be simultaneously worked by a large number of workmen, the devices shown in Figs. 4 and 5 are substantially the same as previously described.

I do not claim, broadly, the idea of a continuously-operating glass-furnace; but I do claim, broadly, the arrangement shown for providing a continuously-operating furnace with closed pots providing closed melting and planing chambers communicating with a highly-heated comparatively large receiving-chamber, whereby glass may be continuously manufactured without exposing it to direct contact with the melting-flames during the melting and planing stages.

Although in the ideal operation of my apparatus as above described the glass will be completely reduced and planed before leaving the reducing pot or retort, it will be obvious to those skilled in the art that in the ordinary operation of my apparatus the planing stage, which requires many hours, will not be completed within the pot, but the initial planing will take place in the pot and the final planing of the metal will occur between the pot or retort and the working chamber H. However, not only will the results desired be substantially obtained in such practical operation of my apparatus, but such results will to a large extent follow regardless of whether the reducing compartment or retort is divided into a reducing and a planing chamber so long as the apparatus provides for protecting the batch during reduction and for the subsequent exposure of the resultant metal to the direct action of a heating medium in accordance with the process fully explained and claimed i my United States Patent No. 766,771.

Obviously many modifications and changes in detail may be made without departing from the spirit of my invention.

As used in this specification the term "continuously operating" is intended to apply to any operation in which the pots or retorts may be fed with fresh material from time to time, if so desired, at the same time that metal is being withdrawn from the pot through the discharge-port.

It will be noted that the process shown and described herein forms the subject-matter of my United States Letters Patent No. 766,771.

I claim—

1. The combination with a furnace of the class described, provided with a receiving-chamber, comprising a planing-tank and a working chamber in communication with each other and in communication with a heating medium, of a closed pot comprising a melting-chamber and a planing-chamber in communication with each other, said pot being also provided with a feed-opening leading from the outside of the furnace into the melting-chamber, and with a discharge-opening leading from the planing-chamber of said pot to the working chamber of said furnace.

2. In a glass-furnace, provided with a heating-chamber and a working chamber, said working chamber being provided with a working opening, the combination with a bench arranged so that the upper surface thereof shall be substantially on a plane above the plane of the bottom of said working opening, and a continuously-operating melting-pot mounted upon said bench and within said heating-chamber, said pot being provided with a feed-opening leading outside of said heating-chamber, and with a discharge-opening communicating with said working chamber.

3. The combination with a glass-melting furnace, provided with a receiving-chamber and with means communicating with the interior of said receiving-chamber for maintaining the metal in a sufficiently fluid condition therein, of a closed melting-pot provided with a partition whereby said pot is divided into a melting-chamber and a planing-chamber, said pot being provided with a feed-opening leading into said melting-chamber and with a dam for maintaining the metal in said pot at a desired height, and a discharge-opening for the passage of the metal over said dam and out of said pot into said receiving-chamber, said partition being provided with a passage-way between said melting and planing chambers.

4. The combination with a glass-furnace provided with a receiving-chamber, of a closed melting-pot having a partition whereby said melting-pot is divided into a melting-chamber and a planing-chamber, said partition being provided with an opening communicating with both of said chambers, a feed-opening leading into said melting-chamber, a dam for maintaining the metal at a desired height in the planing-chamber, said pot being provided with an inclosed passage-way arranged to convey the overflow from the planing-chamber into said receiving-chamber, and means, in communication with the interior of said receiving-chamber, for maintaining the metal therein in a sufficiently fluid condition.

5. In a glass-furnace, a plurality of oppositely-disposed, continuously-operating, closed melting-pots arranged to discharge into a common runway, said pots being provided with feed-openings for continuously charging the same from a point outside the heating-chamber of said furnace, means arranged externally of said pots for melting the contents thereof, and a working chamber arranged to receive the metal from said runway.

6. In a furnace provided with a heating-chamber, and a highly-heated receiving-chamber, a closed melting-pot located in said heating-chamber and mounted above the metal-line in said receiving-chamber, said pot being provided with a feed-opening communicating with the interior thereof, and with a discharge-opening leading therefrom into said receiving-chamber.

7. In a furnace provided with a heating-chamber and a highly-heated receiving-chamber, a closed melting-pot located in said heating-chamber and, mounted above the metal-line in said receiving-chamber, said pot being provided with a feed-opening communicating with the interior thereof, and with a closed passage-way leading therefrom into said receiving-chamber.

8. The combination with a furnace provided with a heating-chamber and a working chamber in free communication therewith, of a closed melting-pot mounted in said heating-chamber and above the metal-line in said receiving-chamber, said melting-pot being provided with a feed-opening and with a discharge-opening for the passage of metal from the interior of said pot into said receiving-chamber, and means for reducing the solid contents of said melting-pot and for maintaining a high temperature in said receiving-chamber.

9. In a glass-furnace, provided with a heating-chamber and a working chamber, a closed melting-pot located in said heating-chamber and provided with a partition whereby it is divided into a melting-chamber and a planing-chamber, said partition having an opening whereby communication is provided between said chambers, said pot being also provided with a feed-opening communicating with said melting-chamber and with a discharge-opening leading from the planing-chamber and communicating with the working chamber of the furnace, and means in communication with the interior of said working chamber for maintaining the metal in a sufficiently fluid condition in said working chamber.

10. In a furnace of the class described, provided with a working chamber comprising a planing-tank, a closed melting-pot comprising a melting-chamber and a planing-chamber in communication with each other, said pot being also provided with a feed-opening leading from the outside of the furnace into the melting-chamber, and with a discharge-opening leading from said pot to said planing-tank, and means in communication with the interior of said planing-tank for maintaining the metal in a sufficiently fluid condition in said tank.

11. The combination with a glass-furnace comprising a working chamber, of a plurality of closed melting-pots provided with feed-openings for charging the same from a point outside of said furnace, means arranged externally of said pots for reducing the contents thereof, means for conveying the resultant metal to the working chamber, and means for maintaining the metal in a sufficiently fluid condition in said chamber.

12. The combination with a glass-furnace provided with a working chamber, of a closed pot, means arranged externally of said pot for reducing the contents thereof, means for conveying the resultant metal to said working chamber, and means communicating with the interior of the working chamber, for maintaining the metal in said working chamber in a fluid condition at less than a reducing heat.

13. In a glass-furnace, the combination with a work-out chamber, of a series of retorts arranged to feed thereinto, and having external feed-in openings, a chamber surrounding the retorts and means for passing the flame and gases through said chamber; substantially as described.

14. A furnace-chamber, a series of retorts extending transversely of the same and having a feed-in opening at one end and an outlet-opening at the other end, means for passing the flame and gases through the furnace-chamber and around the retorts and a work-out chamber arranged to receive the glass from the retorts; substantially as described.

SOLON OSMOND RICHARDSON, JR.

Witnesses:
FREDERICK E. WOLF,
J. H. WRIGHT.